United States Patent
Duraisamy et al.

(10) Patent No.: US 9,194,352 B2
(45) Date of Patent: Nov. 24, 2015

(54) PRESSURE RELIEF VALVE FOR COMMON RAIL FUEL SYSTEM

(71) Applicant: Caterpillar Inc., Peoria, IL (US)

(72) Inventors: Selvakumar Duraisamy, Peoria, IL (US); Kenneth C. Adams, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 483 days.

(21) Appl. No.: 13/660,074

(22) Filed: Oct. 25, 2012

(65) Prior Publication Data

US 2014/0116387 A1 May 1, 2014

(51) Int. Cl.
*F02M 69/50* (2006.01)
*F02M 63/00* (2006.01)
*F02M 61/16* (2006.01)
*F16K 15/04* (2006.01)
*F16K 17/04* (2006.01)
*F16K 25/00* (2006.01)

(52) U.S. Cl.
CPC ......... *F02M 63/0036* (2013.01); *F02M 61/166* (2013.01); *F02M 63/005* (2013.01); *F16K 15/044* (2013.01); *F16K 15/048* (2013.01); *F16K 17/0406* (2013.01); *F16K 25/005* (2013.01); *F02M 2200/9007* (2013.01); *Y10T 137/0379* (2015.04); *Y10T 137/7922* (2015.04)

(58) Field of Classification Search
CPC .... F02D 41/3845; F02M 37/10; F02M 37/22; F02M 63/0225; F02M 69/50
USPC .............................. 123/456–458; 137/12, 535
See application file for complete search history.

(56) References Cited

U.S. PATENT DOCUMENTS

| | | | |
|---|---|---|---|
| 4,577,606 A * | 3/1986 | Bohringer et al. | 123/506 |
| 5,607,106 A | 3/1997 | Bentz et al. | |
| 6,196,201 B1 * | 3/2001 | Fehlmann et al. | 123/510 |
| 6,536,413 B2 * | 3/2003 | Mori | 123/467 |
| 6,622,752 B2 * | 9/2003 | Kushida et al. | 137/539.5 |
| 6,715,468 B2 * | 4/2004 | Uchiyama et al. | 123/339.15 |
| 8,240,291 B2 | 8/2012 | Ibrahim et al. | |
| 2006/0196476 A1 | 9/2006 | Stockner | |
| 2008/0022974 A1 * | 1/2008 | Stockner et al. | 123/457 |
| 2009/0217989 A1 * | 9/2009 | Magnaval et al. | 137/535 |
| 2010/0036585 A1 * | 2/2010 | Scharfenberg | 701/103 |
| 2011/0126804 A1 * | 6/2011 | Lucas et al. | 123/456 |
| 2011/0174270 A1 * | 7/2011 | Harhoff et al. | 123/456 |
| 2011/0196594 A1 * | 8/2011 | Hasegawa | 701/103 |
| 2012/0127823 A1 | 5/2012 | Nakach | |
| 2012/0255632 A1 * | 10/2012 | Newman et al. | 137/535 |

OTHER PUBLICATIONS

M. Kalin, J. Vizintin, S. Novak, G. Drazic; Wear Mechanisms in Oil-Lubricated and Dry Fretting of Silicon Nitride Against Bearing Steel Contacts; University of Lyubljana, Faculty of Mechanical Engineering, Bogisiceva 8, 1000 Ljubljana, Slovenia, Jozef Stefan Institute, Jamova 39, 1000 Ljubljana, Slovenia; (1997); pp. 27-38.

* cited by examiner

*Primary Examiner* — John Kwon
*Assistant Examiner* — Johnny H Hoang

(57) ABSTRACT

A pressure relief valve for a common rail fuel system includes a hard ceramic spherical valve member that moves into and out of contact with a conical valve seat of a soft metallic valve body. Fretting damage to the valve is inhibited by using the dissimilar materials, and by using a guide pin that is allowed to move on the spherical surface of the ceramic spherical valve member. The valve member may be constructed of silicon nitride.

20 Claims, 3 Drawing Sheets

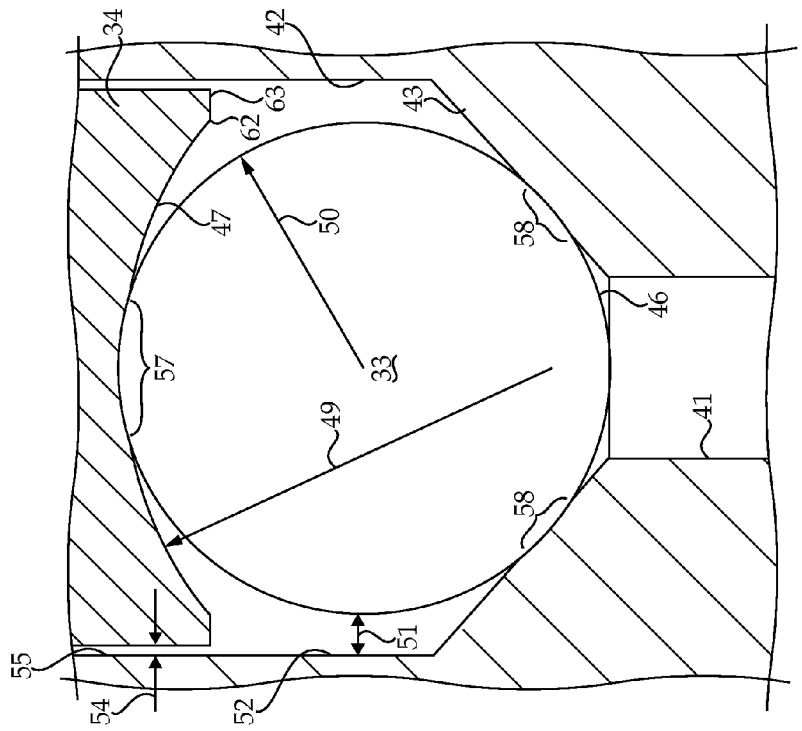
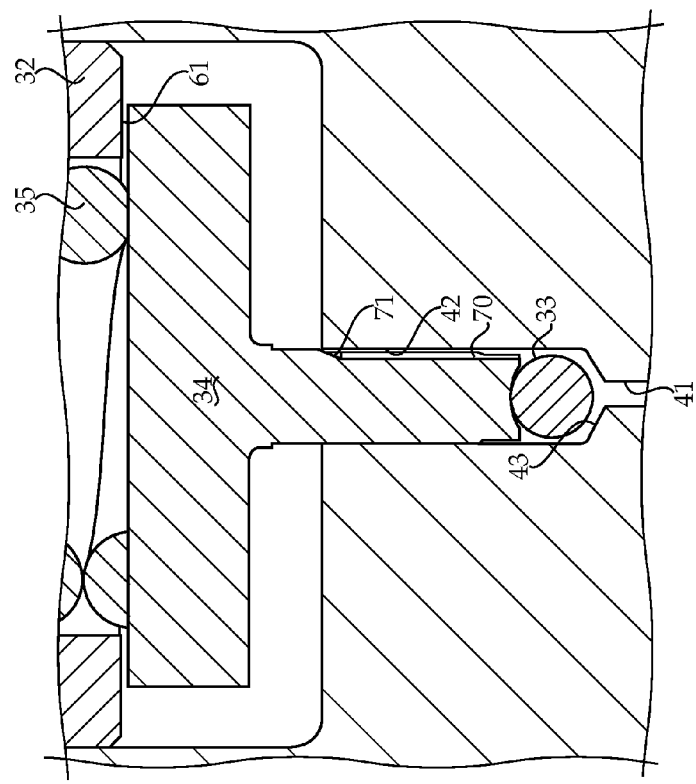
Fig.6
Fig.5

PRESSURE RELIEF VALVE FOR COMMON RAIL FUEL SYSTEM

TECHNICAL FIELD

The present disclosure relates generally to pressure relief valves for common rail fuel systems, and more particularly to a valve structure and material strategy to inhibit fretting and other potential valve damage that could undermine fuel system performance.

BACKGROUND

Common rail fuel systems utilize a common rail maintained at an injection pressure to supply fuel to a plurality of fuel injectors. In many instances, pressure in the common rail is controlled by controlling output from a high pressure pump. In the event of a system fault, such as a failed fuel injector, pressure in the common rail can surge and exceed system design pressures. In order to prevent the common rail system from becoming over pressurized, the industry has taught the use of a pressure relief valve that opens to relieve pressure in the common rail at some valve opening pressure that is substantially higher than normal operating injection pressures. U.S. Pat. No. 8,240,291 and United States Patent Application Publication No. 2006/0196476 show examples of pressure relief valves for use in common rail fuel systems. In the event that the valve develops a leak or some other problem such as opening at a lower pressure than its design valve opening pressure, effective operation of the common rail fuel system can be substantially undermined.

The present disclosure is directed toward one or more of the problems set forth above.

SUMMARY

In one aspect, a pressure relief valve for a common rail fuel system includes a soft metallic valve body having an inner surface defining a high pressure passage separated from a low pressure passage by a conical valve seat. An adaptor is attached to the valve body to define a low pressure chamber fluidly connected to a drain port. A hard ceramic spherical valve member is in contact with the conical valve seat, and has an opening hydraulic surface exposed to fluid pressure in the high pressure passage. A soft metallic pin guide with a concave surface is in contact with the ceramic spherical valve member. A spring is compressed in the low pressure chamber between the pin guide and the adaptor. A shim is in contact with the spring and has a thickness that sets a preload on the spring to define a valve opening pressure. The ceramic spherical valve member moves out of contact with the conical valve seat when a pressure in the high pressure passage acting on the opening hydraulic surface exceeds the valve opening pressure.

In another aspect, a common rail fuel system includes a common rail fluidly connected to a plurality of fuel injectors. A pump has an inlet fluidly connected to a tank, and an outlet fluidly connected to the common rail. A pressure relief valve has a high pressure port fluidly connected to the common rail, and a drain port fluidly connected to the tank. A ceramic spherical valve member moves out of contact with a conical valve seat when a pressure in the common rail acting on the opening hydraulic surface exceeds the valve opening pressure.

In still another aspect, a method of operating a common rail fuel system equipped with the pressure relief valve includes moving pressurized fuel from a common rail to a plurality of fuel injectors. The common rail is fluidly blocked from a tank with the pressure relief valve, by maintaining a rail pressure less than the valve opening pressure. A concave surface of the guide pin is moved on the spherical surface of the ceramic spherical valve member. Fretting is inhibited at the conical valve seat with dissimilar material contact of the ceramic spherical valve member with the metallic valve body.

BRIEF DESCRIPTION OF THE DRAWINGS

FIG. 5 is a sectioned view similar to that of FIG. 4 except showing the valve in its limp home partially open position; and FIG. 6 is a further enlarged view of the ceramic spherical valve member in contact with the conical valve seat and the concave surface of the guide pin.

DETAILED DESCRIPTION

Current production pressure relief valves for common rail fuel systems typically include a metallic valve member that is spherical or has a spherical surface in contact with a metallic conical valve seat. Often times, the valve member and the conical valve seat are made of the same material, such as for instance 52100 steel. Due to vibrations in the fuel system originating from the engine, the high pressure common rail fuel pump and other sources, as well as potentially due to substantial pressure fluctuations in the common rail during normal speed and load changes, some relative micro-motion can produce fretting wear at both the seat and the valve member surfaces. Although some wear at the valve seat is almost inevitable, premature wear can produce leaks and potentially reduce the valve opening pressure sometimes in less than 1,000 hours of operation. The present disclosure recognizes that the potential sources of micro motion may not be capable of being eliminated, but certain changes in the pressure relief valve structure can desensitize the valve to the sources of fretting wear. Two of the routes that achieve an improved pressure relief valve are to utilize different materials for the valve member and the valve seat, and possibly move micro motion to a location between a pin guide and the valve member, rather than the valve member and the valve seat.

Figure 1:
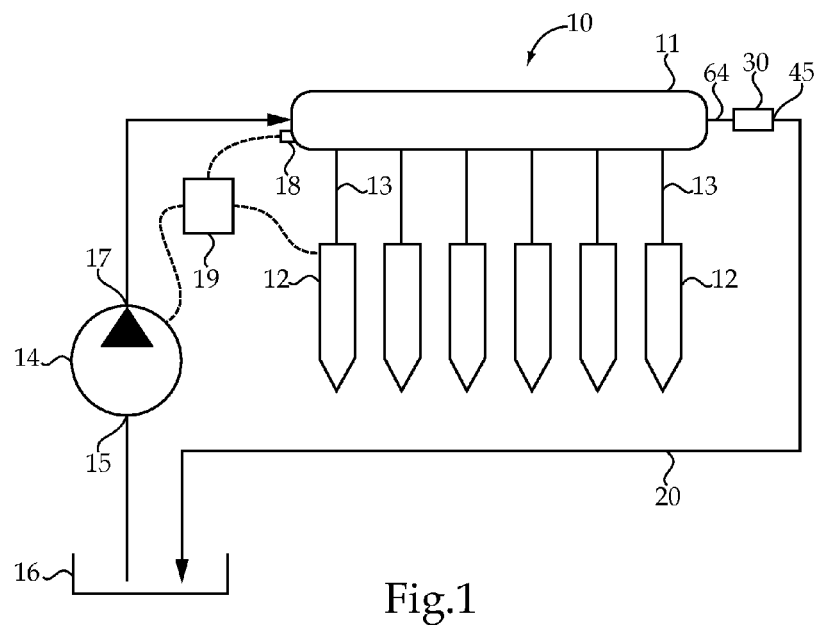
FIG. 1 is a schematic view of a common rail fuel system according to the present disclosure.
Figure 2:
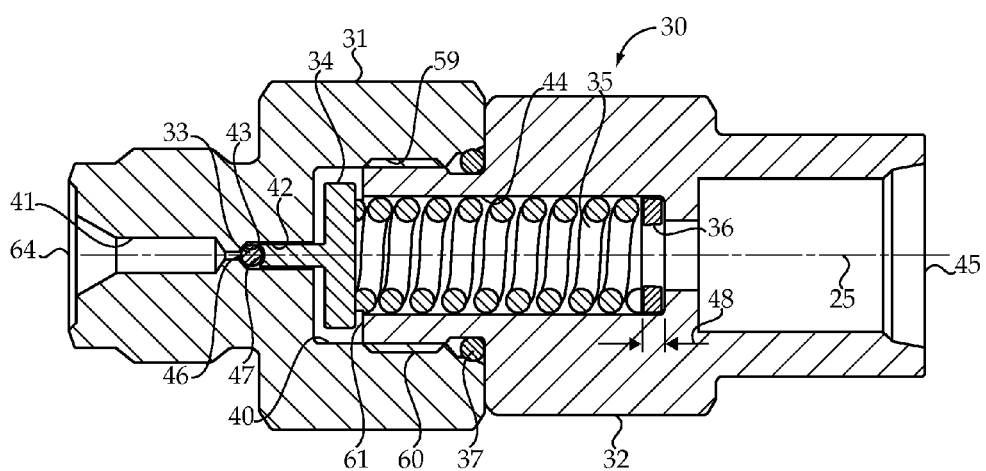
FIG. 2 is a sectioned front view of a pressure relief valve for the common rail fuel system of FIG. 1.

Referring initially to FIG. 1, a common rail fuel system 10 includes a common rail 11 fluidly connected to a plurality of fuel injectors 12 via individual branch passages 13. A high pressure pump 14 has an inlet 15 fluidly connected to a tank 16, and an outlet 17 fluidly connected to the common rail 11. Those skilled in the art will appreciate that a low pressure fuel transfer pump, possible priming systems, fuel filters and the like may be positioned between high pressure pump 14 and tank 16 without departing from the present disclosure. Pressure in common rail 11 may be controlled by controlling the output of high pressure pump 14. In particular, an electronic controller 19 may receive pressure information from a pressure sensor 18 to generate signals to control the output of pump 14, and hence the pressure in common rail 11. Electronic controller 19 may also be in control communication with each of the fuel injectors 12. For instance, at rated operating conditions, high pressure pump 14 may maintain common rail 11 at 190 MPa injection pressure. In order to prevent common rail fuel system 10 from becoming over pressurized, a pressure relief valve 30 may include a high pressure port 64 fluidly connected to common rail 11, and a low pressure drain port 45 fluidly connected to tank 16 via a drain passage 20. Pressure relief valve 30 may have a valve opening pressure substantially higher (e.g., 240 MPa) than the rated operating pressure of common rail fuel system 10 in a known manner. Thus, pressure relief valve 30 may normally almost always be in a closed position, but will fluidly connect common rail 11 to tank 16 to reduce system pressure in the event that the pressure in common rail 11 exceeds the valve opening pressure of the pressure relief valve 30.

Referring now in addition to FIGS. 2-6, pressure relief valve 30 includes a soft metallic valve body 31 that has an inner surface 40 that defines a high pressure passage 41 separated from a low pressure passage 42 by a conical valve seat 43. An adaptor 32 is attached to valve body 31 to define a low pressure chamber 44 fluidly connected to the drain port 45. In the illustrated embodiment, valve body 31 may include a set of internal threads 59, and adaptor 32 may include a set of external threads 60 that are mated to the internal threads 59. An o-ring 37 may be in contact with valve body 31 and adaptor 32 to inhibit leakage out of pressure relief valve 30 from low pressure chamber 44. A hard ceramic spherical valve member 33 is in contact with the conical valve seat 43, and has an opening hydraulic surface 46 exposed to fluid pressure in the high pressure passage 41. A soft metallic pin guide 34 includes a concave surface 47 in contact with the ceramic spherical valve member 33. A spring 35 is compressed in the low pressure chamber 44 between the pin guide 34 and the adaptor 32. A shim 36 is in contact with the spring 35 and has a thickness 48 that sets a pre-load on the spring 35 to define a valve opening pressure. Thus, the ceramic spherical valve member 33 will move out of contact with the conical valve seat 43 to fluidly open a connection between high pressure port 64 and drain port 45 when pressure in the high pressure passage 41 acting on opening hydraulic surface 46 exceeds the valve opening pressure. Although the various components of pressure relief valve 30 may exhibit symmetry about a centerline 25, asymmetrical structures would also fall within the intended scope of the present disclosure. At the time of manufacture, shims 36 having a plurality of different thicknesses may be available for selection so that the shim may be utilized to undo geometrical variations among like manufactured pressure relief valves to yield consistent valve opening pressures. Thus, shim 36 might be considered a category part.

The terms "soft" and "hard" are used in the present disclosure relative to each other, and not in absolute terms. Thus, the soft metallic valve body 31 and the soft metallic pin guide 34, which may be made from the same 52100 steel, and may only be considered to be "soft" relative to the hardness of the ceramic spherical valve member 33. Although a ceramic spherical valve member 33 made from zirconium oxide could be made to work in a pressure relief valve 30 according to the present disclosure, a silicone nitride spherical valve member 33 appeared to work better by exhibiting better resistance to fracturing. In other words, zirconium oxide may be more brittle in the context of the present disclosure than silicone nitride. Those skilled in the art will appreciate that other ceramic compounds could also fall within the intended scope of the present disclosure. However, silicone nitride spherical valve members 33 may be desirable due to their ready availability and current abundance for use in relation to ball bearings.

Although ceramic spherical valve member 33 may substantially inhibit fretting wear at the valve seat 43 due at least in part to the dissimilar material contact, new problems may be created. For instance, ceramics may be substantially more brittle and subject to fracture than counterpart metallic components. In addition, the hardness of the ceramic material can cause chipping or other wear on metallic components that could liberate undesirable debris into the fuel system. The present disclosure addresses these issues in a number of subtle but effective ways. For instance, by utilizing a concave surface 47 on pin guide 34 in contact with ceramic spherical valve member 33, the contact between these two components can be made to occur over a surface rather than as a point load in the event that guide pin 34 had a planar bottom. Because the ceramic spherical valve member 33 is harder than the counterpart soft metallic pin guide 34, the ceramic spherical valve member 33 can produce a yielded contact area 57 (FIG. 6) that matches the spherical shape of valve member 33 so that the loading force from spring 35 occurs over a relatively large area fraction to inhibit breakage of the ceramic spherical valve member 33. This same phenomenon may result in a yielded contact area 58 between the ceramic spherical valve member 33 and the conical valve seat 43 that matches the spherical shape of the ceramic spherical valve member 33 so that the contact between the valve member and the seat occurs over a thin annular band surface to distribute the load, rather than at an annular line if no yielding of the soft metallic component occurred. Another subtle feature that may help to reduce the risk of valve member breakage may be to make the concave surface 47 spherical with a radius 49 that is greater than a radius 50 of the ceramic spherical valve member 33. For instance, in one specific example, the ceramic spherical valve member 33 may have a radius of about 0.85 millimeters, whereas the concave surface 47 may have a radius of 1.5 millimeters. The ceramic spherical valve member 33 may have a first radial clearance 51 with respect to a bore wall 52 that defines a first segment 53 of the low pressure passage 42. The guide pin 34 may have a second radial clearance 54 with respect to a guide bore wall 55 that defines a second segment 56 of the low pressure passage 44. The first radial clearance 51 may be larger than the second radial clearance 54. The concave surface 47 may terminate at a rim 62 at an end 63 of pin guide 34. The low pressure passage 42 is partially defined by the bore wall 52 that limits movement of the ceramic spherical valve member 33 to prevent contact between the rim 62 and the ceramic spherical valve member 33 to both protect the valve member from breakage and to reduce the likelihood of metallic chipping or wear at rim 62 that might otherwise occur.

Figure 3:
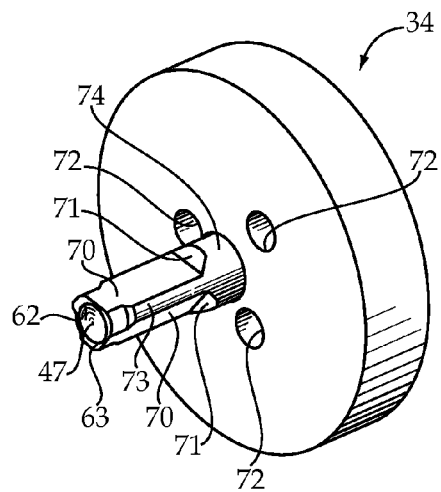
FIG. 3 is an isometric view of the guide pin for the pressure relief valve of FIG. 2.
Figure 4:
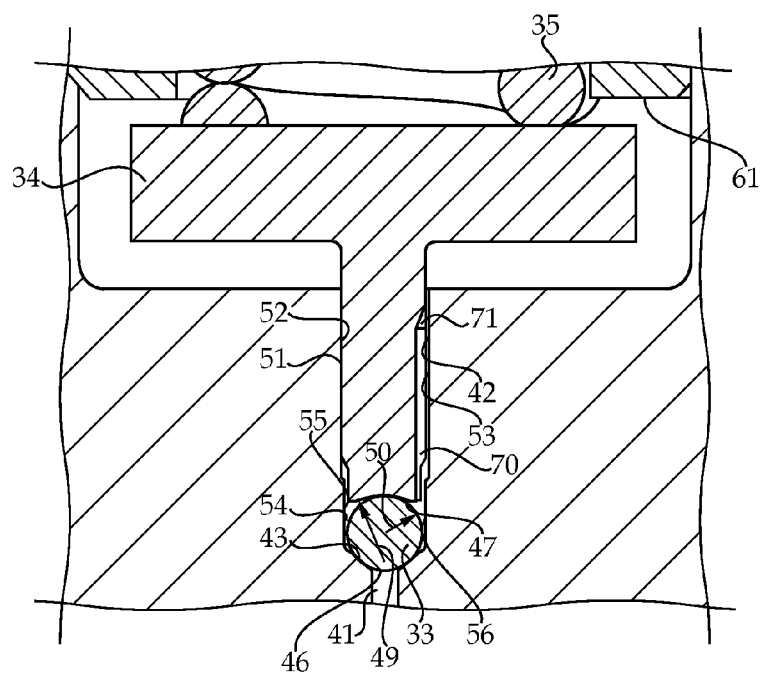
FIG. 4 is an enlarged sectioned side view of the guide pin and spherical valve member when the valve is in its closed position.

As best shown in FIG. 3, pin guide 34 may be constructed to include a plurality of flats 70 (e.g., three flats) that are separated from one another by rounded guide surfaces 73. In addition, pin guide 34 may define a plurality of through holes 72 to inhibit hydraulic locking and promote fluid communication past pin guide 34. The flats 70 may transition to a cylindrical segment 74 with champhers 71, which may be engineered in the way of slope and size to contribute to setting a so called limp home pressure at which pressure relief valve 30 remains open after initially being pushed open so that common rail fuel system 10 may operate at some reduced pressure in the event of a over pressurization fault without completely disabling the common rail fuel system 10. For instance, FIG. 4 shows that pin guide 34 is trapped to move between an open position in contact with a stop surface 61 on adaptor 32, and a closed position (as shown) in contact with the ceramic spherical valve member 33, which is itself in contact with the conical valve seat 43. It may be noted that the champhers 71 may be completely located inside of guide bore 55 when the valve is in its closed position. However, the guide pin may assume a stable partially open position as shown in FIG. 5 corresponding to a limp home pressure existing in the high pressure passage 41. The limp home pressure is lower than the valve opening pressure. For instance, if the valve opening pressure were 240 MPa, the limp home pressure might be 80 MPa to facilitate operation of the common rail fuel system 10 at a functional but reduced level. At the stable partially open position, the champhers 71 may be partially located in guide bore 55 and partially located outside of the same. Thus, at this stable partially open position, the fluid forces acting on ceramic spherical valve member 33 and guide pin 34 at the limp home pressure may balance the mechanical force from spring 35. Note that guide pin 34 remains out of contact with stop surface 61 at the partially opened position shown in FIG. 5.

INDUSTRIAL APPLICABILITY

The present disclosure finds potential application in any pressure relief valve for common rail fuel systems that may be subject to fretting wear. The pressure relief valve of the present disclosure finds specific applicability to high pressure common rail fuel systems associated with compression ignition engines that burn diesel fuel.

The present disclosure teaches that fretting may be inhibited by the dissimilar material contact between the soft metallic material of the conical valve seat 43 and the hard ceramic spherical valve member 33. Breakage of the ceramic spherical valve member may be inhibited by utilizing a silicone nitride spherical valve member 33 as the ceramic material of choice in pressure relief valve 30. Finally, liberation of material from the guide pin 34 and/or from breakage of the ceramic spherical valve member 33 may be inhibited by preventing contact between the ceramic spherical valve member 33 and the rim 62 on the end 63 of guide pin 34 where the concave surface 47 terminates.

During normal operation, pressurized fuel is moved from the common rail 11 to the plurality of fuel injectors 12. The common rail 11 is fluidly blocked from tank 16 with the pressure relief valve 30 by maintaining a rail pressure less than the valve opening pressure of the pressure relief valve 30. Mechanical vibrations and/or pressure fluctuations in common rail 11 may cause the concave surface 47 of the pin guide 34 to move in micro motion on a spherical surface of the ceramic spherical valve member 33. Thus, the present disclosure attempts to move micro motion that may inevitably occur to a location where the pin guide 34 contacts the ceramic spherical valve member 33, rather than where the valve member 33 contacts the valve seat 43 as in at least some prior art designs.

In some cases, the common rail fuel system 10 may develop a fault the causes the rail pressure to exceed the valve opening pressure of the pressure relief valve 30. When this occurs, the ceramic spherical valve member 33 moves out of contact with the conical valve seat 43 to fluidly connect the common rail 11 to the tank 16 responsive to the fuel system fault. After opening, the ceramic spherical valve member may be maintained at a partially open position by balancing fluid forces on the guide pin 34 and the ceramic spherical valve member 33 against the biasing force from spring 35. As a result, the rail pressure in common rail 11 may be sustained at a limp home pressure responsive to maintaining the ceramic spherical valve member 33 and the partially open position. This may allow a vehicle equipped with an engine that utilizes common rail fuel system 10 to limp home under reduced power to receive needed servicing in the event of a fuel system fault, such as a plugged fuel injector or other fault known in the art that could cause a pressure surge.

At the time of manufacturing, it may be desirable to first select a shim 36 having a desirable thickness 48 to initially set the valve opening pressure. The valve may then be actuated maybe two to ten times to align the pin guide 34 and the conical valve seat 43. Next, the valve may be actuated another maybe two to twenty times to generate the yielded contact areas 57 and 58 that are shown in FIG. 6 to achieve some stable geometry before the pressure relief valve 30 is ever even put into service. Next, it might be desirable to test the valve opening pressure to confirm that the valve opens at a valve opening pressure within some acceptable range. For instance, the minimum valve opening pressure might be 242 plus or minus 8 MPa, but have a maximum acceptable valve opening pressure of maybe 255 MPa. After completing the assembly, alignment and yielding break in, the pressure relief valve 30 may be ready to be put into service.

It should be understood that the above description is intended for illustrative purposes only, and is not intended to limit the scope of the present disclosure in any way. Although the pressure relief valve 30 of the present disclosure has been illustrated for use in a common rail fuel system 10, those skilled in the art will appreciate that the same structure could find potential use in other hydraulic systems that may be subject to vibrations and/or pressure fluctuations without departing from the intended scope of the present disclosure. Thus, those skilled in the art will appreciate that other aspects of the disclosure can be obtained from a study of the drawings, the disclosure and the appended claims.

What is claimed is:

1. A pressure relief valve for a common rail fuel system, comprising:
   a soft metallic valve body having an inner surface defining a high pressure passage separated from a low pressure passage by a conical valve seat;
   an adapter attached to the soft metallic valve body to define a low pressure chamber fluidly connected to a drain port;
   a hard ceramic spherical valve member in contact with the conical valve seat, and having an opening hydraulic surface exposed to fluid pressure in the high pressure passage;
   a soft metallic pin guide with a concave surface in contact with the ceramic spherical valve member in which a yielded contact area between the ceramic spherical valve member and the concave surface matches a spherical shape of the ceramic spherical valve member to distribute a loading force;
   a spring compressed in the low pressure chamber between the soft metallic pin guide and the adapter;
   a shim in contact with the spring and having a thickness that sets a preload on the spring to define a valve opening pressure; and
   wherein the ceramic spherical valve member moves out of contact with the conical valve seat when a pressure in the high pressure passage acting on the opening hydraulic surface exceeds the valve opening pressure.

2. The pressure relief valve of claim 1, wherein the concave surface is spherical with a radius greater than a radius of the ceramic spherical valve member.

3. The pressure relief valve of claim 1, wherein the ceramic spherical valve member has a first radial clearance with respect to a bore wall that defines a first segment of the low pressure passage;
  the soft metallic pin guide has a second radial clearance with respect to a guide bore wall that defines a second segment of the low pressure passage; and
  the first radial clearance is larger than the second radial clearance.

4. The pressure relief valve of claim 1, wherein the ceramic spherical valve member is a silicon nitride spherical valve member.

5. The pressure relief valve of claim 1, wherein
  a yielded contact area between the ceramic spherical valve member and the conical valve seat matches the spherical shape of the ceramic spherical valve member.

6. The pressure relief valve of claim 1, wherein the soft metallic valve body includes a set of internal threads;
  the adapter includes a set of external threads mated to the internal threads; and
  an O-ring is in contact with the soft metallic valve body and the adapter.

7. The pressure relief valve of claim 1, wherein the soft metallic pin guide is trapped to move between an open position in contact with a stop surface on the adapter and a closed position in contact with the ceramic spherical valve member in contact with the conical valve seat;
  the soft metallic pin guide having a stable partially open position corresponding to a limp home pressure in the high pressure passage; and
  the limp home pressure is lower than the valve opening pressure.

8. The pressure relief valve of claim 1, wherein the soft metallic valve body has a centerline;
  the concave surface terminates at a rim at an end of the soft metallic pin guide;
  the low pressure passage is partially defined by a bore wall that limits movement of the ceramic spherical valve member relative to the centerline to prevent contact between the rim and the ceramic spherical valve member.

9. A common rail fuel system comprising:
  a common rail fluidly connected to a plurality of fuel injectors;
  a pump with an inlet fluidly connected to a tank, and an outlet fluidly connected to the common rail;
  a pressure relief valve with a high pressure port fluidly connected to the common rail, and a drain port fluidly connected to the tank;
  the pressure relief valve including a soft metallic valve body having an inner surface defining a high pressure passage separated from a low pressure passage by a conical valve seat;
  an adapter attached to the soft metallic valve body to define a low pressure chamber fluidly connected to a drain port;
  a hard ceramic spherical valve member in contact with the conical valve seat, and having an opening hydraulic surface exposed to fluid pressure in the high pressure passage;
  a soft metallic pin guide with a concave surface in contact with the ceramic spherical valve member in which a yielded contact area between the ceramic spherical valve member and the concave surface matches a spherical shape of the ceramic spherical valve member to distribute a loading force;
  a spring compressed in the low pressure chamber between the soft metallic pin guide and the adapter;
  a shim in contact with the spring and having a thickness that sets a preload on the spring to define a valve opening pressure; and
  wherein the ceramic spherical valve member moves out of contact with the conical valve seat when a pressure in the common rail acting on the opening hydraulic surface exceeds the valve opening pressure.

10. The common rail fuel system of claim 9, wherein the soft metallic valve body has a centerline;
  the concave surface terminates at a rim at an end of the soft metallic pin guide;
  the low pressure passage is partially defined by a bore wall that limits movement of the ceramic spherical valve member to prevent contact between the rim and the ceramic spherical valve member.

11. The common rail fuel system of claim 10, wherein the soft metallic pin guide is trapped to move between an open position in contact with a stop surface on the adapter and a closed position in contact with the ceramic spherical valve member in contact with the conical valve seat;
  the soft metallic pin guide having a stable partially open position corresponding to a limp home pressure in the common rail; and
  the limp home pressure is lower than the valve opening pressure.

12. The common rail fuel system of claim 11, wherein the ceramic spherical valve member is a silicon nitride spherical valve member.

13. The common rail fuel system of claim 12, wherein the silicon nitride valve member has a first radial clearance with respect to the bore wall;
  the soft metallic pin guide has a second radial clearance with respect to a guide bore wall that defines a second segment of the low pressure passage; and
  the first radial clearance is larger than the second radial clearance.

14. The common rail fuel system of claim 13, wherein the yielded contact area between the silicon nitride spherical valve member and the concave surface matches a spherical shape of the silicon nitride spherical valve member; and
  a yielded contact area between the silicon spherical valve member and the conical valve seat matches the spherical shape of the silicon nitride spherical valve member.

15. A method of operating a common rail fuel system equipped with a pressure relief valve that includes a soft metallic valve body having an inner surface defining a high pressure passage separated from a low pressure passage by a conical valve seat;
  an adapter attached to the soft metallic valve body to define a low pressure chamber fluidly connected to a drain port;
  a hard ceramic spherical valve member in contact with the conical valve seat, and having an opening hydraulic surface exposed to fluid pressure in the high pressure passage;
  a soft metallic pin guide with a concave surface in contact with the ceramic spherical valve member;
  a spring compressed in the low pressure chamber between the soft metallic pin guide and the adapter;
  a shim in contact with the spring and having a thickness that sets a preload on the spring to define a valve opening pressure, the method comprising the steps of:
    moving pressurized fuel from a common rail to a plurality of fuel injectors;
    fluidly blocking the common rail from a tank with a pressure relief valve by maintaining a rail pressure less than the valve opening pressure;

moving the concave surface of the soft metallic pin guide on a spherical surface of the ceramic spherical valve member;

inhibiting fretting at the conical valve seat with dissimilar material contact of the ceramic spherical valve member with the metallic valve body in which a yielded contact area between the ceramic spherical valve member and the concave surface matches a spherical shape of the ceramic spherical valve member to distribute a loading force.

16. The method of claim 15 including a step of inhibiting breakage of the ceramic spherical valve member by utilizing a silicon nitride spherical valve member as the ceramic spherical valve member of the pressure relief valve.

17. The method of claim 16 including steps of developing a fuel system fault that causes the rail pressure to exceed the valve opening pressure; and moving the silicon nitride spherical valve member out of contact with the conical valve seat to fluidly connect the common rail to the tank responsive to the fuel system fault.

18. The method of claim 17 including steps of maintaining the silicon nitride spherical valve member in a partially open position by balancing fluid forces on the soft metallic pin guide and the silicon nitride spherical valve member against a biasing force from the spring; and sustaining rail pressure at a limp home pressure responsive to maintaining the silicon nitride spherical valve member in a partially open position.

19. The method of claim 18 including a step of inhibiting liberation of material from the soft metallic pin guide by preventing contact between the silicon nitride spherical valve member with a rim on an end of the soft metallic pin guide wherein the concave surface terminates.

20. The method of claim 19 including a step of yielding the soft metallic material of the concave surface to match the spherical surface of the hard silicon nitride spherical valve member.

* * * * *